United States Patent
DeWaard et al.

(10) Patent No.: US 10,919,815 B2
(45) Date of Patent: *Feb. 16, 2021

(54) METHOD AND SYSTEM FOR COMPOUNDING FERTILIZER FROM MANURE WITHOUT NUTRIENT EMISSION

(71) Applicant: DariTech, Inc., Lyndan, WA (US)

(72) Inventors: David DeWaard, Lyndan, WA (US); Josh McCort, Lynden, WA (US); Michael Klapper, Lynden, WA (US)

(73) Assignee: Dari-Tech, Inc., Lynden, WA (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/055,500

(22) Filed: Aug. 6, 2018

(65) Prior Publication Data

US 2019/0119179 A1    Apr. 25, 2019

Related U.S. Application Data

(63) Continuation-in-part of application No. 15/792,442, filed on Oct. 24, 2017, now Pat. No. 10,683,239.

(51) Int. Cl.
*C05F 17/10*    (2020.01)
*C05F 3/06*    (2006.01)
(Continued)

(52) U.S. Cl.
CPC ............ *C05F 17/10* (2020.01); *A01C 3/028* (2013.01); *C05C 3/00* (2013.01); *C05F 3/00* (2013.01);
(Continued)

(58) Field of Classification Search
None
See application file for complete search history.

(56) References Cited

U.S. PATENT DOCUMENTS

| | | | | |
|---|---|---|---|---|
| 2,951,755 | A | * 9/1960 | Joffe | C05F 11/08 71/6 |
| 4,292,328 | A | * 9/1981 | Coulthard | C12N 1/20 426/2 |

(Continued)

FOREIGN PATENT DOCUMENTS

| EP | 0498084 | * 8/1992 | ............ C05F 3/00 |
|---|---|---|---|
| EP | 0498084 A1 | 8/1992 | |

*Primary Examiner* — Wayne A Langel
(74) *Attorney, Agent, or Firm* — Williams Kastner & Gibbs PLLC; Mark Lawrence Lorbiecki

(57) ABSTRACT

To produce fertilizer, a system and method concentrates manure slurry in a mechanical vapor recompression evaporator ("MVR") having a heat exchanger. The MVR receives the manure slurry within a first side to evaporate ammonia laden-water vapor from the slurry, leaving a nutrient concentrate. A compressor raises the evaporated ammonia-laden water vapor to a higher energy state. Within a second side of the heat exchanger, the compressed water vapor conveys heat to the slurry. Ammonia-laden water condenses in the second side at a process temperature to be conveyed to an ammonia stripping tower where the ammonia-laden water is dispersed into ammonia-laden water droplets. In the tower, a flow of air is directed across a surface of the ammonia-laden water droplets, the process temperature having been selected to promote the escape of ammonia gas from the ammonia-laden water droplets, the flow of air provided to entrain ammonia gas in the flow.

26 Claims, 5 Drawing Sheets

(51) Int. Cl.
  *C05F 17/40*    (2020.01)
  *C05F 17/971*   (2020.01)
  *C05F 3/00*     (2006.01)
  *C05C 3/00*     (2006.01)
  *A01C 3/02*     (2006.01)

(52) U.S. Cl.
  CPC .............. *C05F 3/06* (2013.01); *C05F 17/40* (2020.01); *C05F 17/971* (2020.01); *A01C 3/023* (2013.01)

(56) References Cited

U.S. PATENT DOCUMENTS

| | | | |
|---|---|---|---|
| 4,411,682 A * | 10/1983 | Brill | C05F 17/00 |
| | | | 71/9 |
| 4,668,250 A | 5/1987 | Drese | |
| 5,593,590 A | 1/1997 | Steyskal | |
| 5,810,975 A | 9/1998 | Bourdel | |
| 5,928,412 A | 7/1999 | Bastholm | |
| 6,368,849 B1 | 4/2002 | Norddahl | |
| 6,513,580 B1 | 2/2003 | Bourdel | |
| 6,623,546 B1 | 9/2003 | Bourdel | |
| 9,962,623 B2 | 5/2018 | Zaher | |
| 10,683,239 B2 * | 6/2020 | DeWaard | C05C 3/00 |
| 2002/0158024 A1 * | 10/2002 | Van Slyke | C05F 3/00 |
| | | | 210/696 |
| 2003/0057160 A1 | 3/2003 | Williams | |
| 2010/0319423 A1 * | 12/2010 | Thomsen | C05F 3/00 |
| | | | 71/21 |
| 2012/0074058 A1 | 3/2012 | Zeng | |
| 2013/0105398 A1 | 5/2013 | Wennergreen | |
| 2013/0344558 A1 * | 12/2013 | Green | C05F 17/964 |
| | | | 435/170 |
| 2014/0083919 A1 | 3/2014 | Li | |
| 2014/0311889 A1 | 10/2014 | Zaher | |
| 2015/0299056 A1 | 10/2015 | Ingels | |
| 2016/0002131 A1 | 1/2016 | Glasspool | |
| 2016/0037781 A1 * | 2/2016 | Hashman | A23K 10/12 |
| | | | 800/298 |
| 2016/0102026 A1 | 4/2016 | Hulls | |
| 2016/0176768 A1 | 6/2016 | Norddahl | |
| 2017/0073598 A1 | 3/2017 | Heimann | |

\* cited by examiner

METHOD AND SYSTEM FOR COMPOUNDING FERTILIZER FROM MANURE WITHOUT NUTRIENT EMISSION

PRIORITY CLAIM

This application is a continuation-in-part of Ser. No. 15/792,442 dated 24 Oct. 2017 and entitled "METHOD AND SYSTEM FOR COMPOUNDING FERTILIZER FROM MANURE WITHOUT NUTRIENT EMISSION" placed on file by the instant inventors; the whole of which is incorporated herein, as if fully set forth, by this reference.

FIELD OF THE INVENTION

The invention resides in the field of manure management more specifically in the compounding of manure constituents to manufacture fertilizer.

BACKGROUND OF THE INVENTION

Manure management on large dairy farms has become a major issue due to air quality and water quality concerns arising from the release of excess nutrients such as nitrogen and phosphorus into the environment. Yet, the nutrients found in manure can be exploited as a valuable fertilizer for any farming operation as it has been used for centuries. The use of manure as fertilizer completes the cycle of nutrients wherein crops feed livestock and the livestock supplies nutrients to the crops.

In spite of the ready availability of manure in dairy operations, use of manure as fertilizer has generally declined on many farms over the past 50 years. This decline in use of manure to fertilize crops is due to: 1) farm specialization with increasing separation of crop and livestock production, 2) the cost of transporting manure (which is a bulky, relatively low analysis nutrient source relative to the delivered benefit), and 3) increased availability of high analysis synthetic fertilizers that usually provide a cheaper source per unit of nutrient than manure. Nonetheless, given the bioavailability of the conventionally analyzed nutrients in manure (as well as other nutrients occurring naturally in manure), the mounting demand for produce grown using organic fertilizers in recent years, and the greater awareness of benefits of nutrient conservation in manure-based fertilizer production, dairymen have renewed their interest in the use of manure as or as a component of organic fertilizers.

While manure (raw or composted) contains many nutrients for crop production (including micronutrients), manure is also a valuable source of organic matter for soil amendment. Using manure to increase the volume of organic matter in soil improves the soil's structure or tilth and, thereby: 1) increases the water-holding capacity of coarse-textured sandy soils; 2) improves drainage in fine-textured clay soils; 3) provides a source of slow release nutrients; 4) reduces wind and water erosion; and 5) promotes growth of earthworms and other beneficial soil organisms. Typically, most harvest-type crops suffer the return of only small amounts of crop residue to the soil, so manure, compost, and other organic amendments may be necessary to maintain organic matter levels in soil.

Applying dairy manure in conventional volumes, however, may not yield an ideally balanced nutrient blend in agricultural soils. Often raw dairy manure may not include sufficient levels of nitrogen, phosphate oxide, and potassium oxide (these are the three traditional numbers by which fertilizers are described) to adequately support optimal growth of crops. Where the presence of any of these three ingredients is too low, the exclusive use of manure to amend soil can lead to nutrient deficiency and, as a result, low crop yields. On the other hand, properly balanced nutrient blends can enhance manure-based fertilizer to be more efficacious from both a production and environmental standpoint.

Where additional synthetic fertilizer is used to enhance the presence of certain nutrients, application of that synthetic fertilizer might result in localized excesses of nutrients, which can, in turn, lead to nitrate leaching, phosphorus runoff, accelerated eutrophication of lakes, and excessive vegetative growth of some crops. Thus, understanding how to optimally formulate a manure-based fertilizer is an important element of opportunity for any farming operation with livestock. What is desirable, is the optimal exploitation of manure to serve as a major source of nutrients for growing feed or for resale as agricultural fertilizer.

Fresh, non-composted, manure will generally have a higher nitrogen content than composted manure. So, while uncomposted manure is high in soluble forms of nitrogen, it may contain high numbers of viable weed seeds, which can infest a cultivated crop. In addition, various pathogens such as *E. coli* may be present in uncomposted manure which can cause illness to individuals eating fresh produce unless proper precautions are taken. For that reason, noncomposted manure is not used for producing either food or feed crops. Composting generates heat and that heat kills these pathogens.

Unfortunately, the process of composting manure strips available nitrogen from that raw manure by volatilization. While the resulting compost may be very valuable for its organic content, it is deficient, lacking that essential nitrogen that heat has driven off by the composting process. Thus, conventional composting presents a compromise, In some conventional processes, drying is used to kill pathogens. Drying with sufficient heat will kill weed seeds and pathogens in the manure. Drying has several benefits in the production of fertilizer. Drying manure to low moisture content reduces the volume and weight of the manure; and that reduction lowers transportation costs. Dried manure products can also be easier to handle and easier to apply uniformly to fields. Dried manure products are readily stored. These advantages are especially prevalent in those dried manures that have been processed and formed into pellets. But, that drying also requires an expensive expenditure of energy; that expense alters the economics of manure use, The heat necessary to kill pathogens elevates manure temperatures to exceed 150 to 175° F. for at least one hour and ought also to be sufficient to reduce water content to 10 to 12% or less. Composting also accomplishes this internal heating as is necessary to sterilize the manure by exploiting heat generated by microbial respiration. Thus, while either raw manure or composted manure can be sufficiently heated to sterilize it suitably for use as fertilizer, each form of processed manure is burdened by its own separate shortcomings and either process will drive off nitrogen as ammonia gas.

As may be apparent, none of these conventional methods of conditioning manure will produce an ideal fertilizer. What is needed in the art is a method and system for recovering nitrogen from manure, isolating compostable organic solids, and as chosen, to recombine these in selected proportions as well as to retain as many of the nutrients present in the harvested raw manure. The need exists to recombine nutrients and organic solids in manure into fertilizer while removing water, inert organics and sand, to produce compact and efficacious fertilizer,

SUMMARY OF THE INVENTION

To produce fertilizer, a system and method concentrates manure slurry in a mechanical vapor recompression evaporator ("MVR") having a heat exchanger. The MVR is an evaporator which exploits heat to drive off moisture as vapor. The MVR receives the manure slurry within a first side of a chamber including a heat exchanger to evaporate ammonia laden-water vapor from the slurry, leaving a nutrient concentrate. A compressor raises the evaporated ammonia-laden water vapor to a higher energy state. Within a second side of the heat exchanger, the compressed water vapor conveys heat to the slurry through the second side of the heat exchanger. Ammonia-laden water vapor condenses at the second side of the heat exchanger which is cooled by contact with slurry on the first side of the heat exchanger. When the ammonia-laden water vapor is condensed at a process temperature, it is conveyed to an ammonia stripping tower where the ammonia-laden water is dispersed into ammonia-laden water droplets. In the tower, a flow of air is directed across a surface of the ammonia-laden water droplets. A designated process temperature of the droplets is selected to promote the escape of ammonia gas from those ammonia-laden water droplets. The provided flow of air is then used to entrain ammonia gas in the flow.

A notable synergy of operation is possible because of the thermal proximity the mechanical vapor recompressor bears to the ammonia stripping tower. Put another way, the high heat of the compressed vapor condensate makes stripping of the ammonia easier because of the higher energy the condensate contains. Condensate comprising ammonia-laden water leaves the MVR at a process temperature, the temperature being selected to encourage the liberation of ammonia gas from the ammonia-laden water leaving nearly pure water. Subjected to a mist of sulfuric acid, the ammonia is, then, entrained in a flow of air reacts to form ammonium sulfate either in a water droplet as solution or in solid form.

The manure slurry, i.e. that portion remaining in the mother-liquid vessel of the MVR that has been concentrated by the evaporative release of the ammonia-laden water vapor, yields a nutrient concentrate suitable as a principal constituent of an efficacious fertilizer. This nutrient concentrate may, optionally, serve as feedstock for an in-vessel composter. In various embodiments of the invention, any of the organic solids, nutrient concentrate or aerobic thermophilic microorganisms ("ATM"), may be added to the composter feedstock to augment the nutrient concentrate, thereby to produce various fertilizers in distinct formulations. Advantageously, because the MVR removes water while reclaiming all the nitrogen from the ammonia-laden water vapor as ammonium sulfate, what drying is necessary to condition the nutrient concentrate for composting is accomplished while volatizing little nitrogen. The nutrient concentrate in its dried form remains potent.

Additionally, because the separation steps remove nearly all nitrogen as ammonium sulfate and because the remaining nutrients are less volatile drying produces a fertilizer in accord with a desired make up. No excess nutrients escape to the environment, and in their recovered form, each has economic value. The resulting fertilizers provide optimally bioavailable nitrogen and organic solids to enhance soil. In first and second optional embodiments of the invention, solids from either of primary or secondary separation of the manure slurry can be used to produce, either by digestion or by gasification, energy for dairy operations including those steps of the instant method, such as in drying manure. In toto, the method and system, separates manure into constituent nutrient and organic fractions and, in optional embodiments, compounds the concentrated nutrients and organic solids into efficacious fertilizer.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
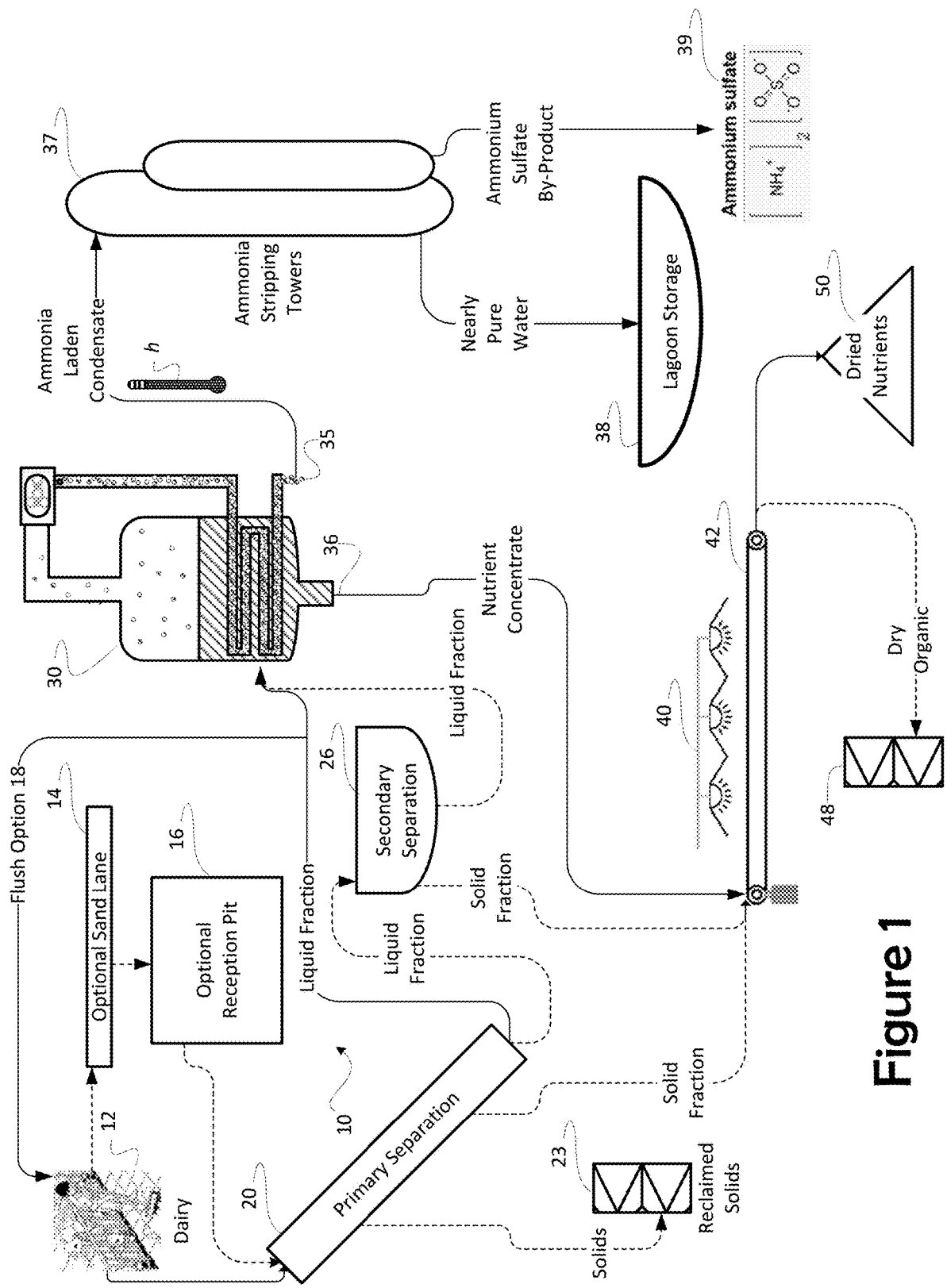
FIG. 1 depicts a method and system for separating nutrient concentrate, ammonium sulfate, and organic solids from manure.

A preferred embodiment of the invention is depicted in FIG. 1. A system 10 for extracting nutrients from raw manure is depicted as comprising a primary separator 20 and a mechanical vapor recompression evaporator ("MVR 30") operated in conjunction with an ammonia stripper feeding an ammonia concentrating stack in the preferred embodiment (referred to herein collectively as ammonia stripping vessel 37). In the preferred embodiment, collected nutrient concentrate and reclaimed solids 23 and be suitably blended and composted to produce a variety of valuable fertilizers. In a presently preferred embodiment, the MVR 30 is specifically an MVR-type evaporator. Evaporation by mechanical vapor recompression requires lesser amounts of energy to achieve a concentration of nutrients in solution than might be used when concentrating by conventional drying or than might he used in other evaporative methods to condense the liquid fraction resulting from separation.

Separation at an optional secondary separator 26 further removes suspended solids to present a more completely liquid fraction for concentrating downstream at the MVR 30. In this manner the exploitation of the optional secondary separator 26 improves the efficiency of the MVR 30. Because the suspended solids removed at the secondary separator 26 tend to be fibrous and non-nutritive particulate, removal of that particulate, like the removal of sand, assures that the remaining liquid after separation is much more completely useful in formulating fertilizer.

Importantly, just as with the removal of sand, primary separation seeks to remove inert organic matter such as cellulose from the final fertilizer product. Cows and other ruminants create an environment in their rumen which encourages microbial degradation, converting cellulose to volatile fatty acids and microbial biomass which the ruminant can then digest and use. Because of that digestion, cow feces do not contribute cellulose to the manure. But, cellulose such as that in straw, is not readily compostable. The removal of this inert solid particulate matter from the process assures that only high-value organic matter will be composted to ultimately compound fertilizer, thereby the fertilizer products the process yields are uniformly effective and that each component of the compounded fertilizer contributes in a known quantity and in a known manner. The removal of sand and inert organics assures uniformity of the intended product and its conformance to the highest standards of quality in organic fertilizer.

Further advantages exist in the configuration of the instant invention. For example, process heat h from the MVR 30 is optionally used to optimize equilibrium in an ammonia stripping vessel 37 to assure a maximum yield of ammonium sulfate for resale as fertilizer and to do so with the least expenditure of supplemental energy. Fresh water from the MVR 30, after being stripped of its ammonia content in the ammonia stripping stack 37 can he retained for use in the dairy, possibly by storing in a holding lagoon 38 for use either as flush water or as irrigation water.

Parenthetically, the inventors note, in a modern dairy, manure is moved by employing high volume manure pumps. Flow through these pumps is selected to occur at a flow rate adequate to prevent settling of manure solids as the manure is transported. While pumps are not portrayed in these FIGS. 1-3, the presence of those pumps is presumed. Because the movement of pumped manure within a dairy is well-known, depicting individual pumps is not necessary to convey an understanding of the invention. Pumps are not shown. Where conduits between elements of the system are portrayed, pumps might be employed to assure the movement of manure through those conduits in actual operation, From the dairy 12, manure is conveyed as solids entrained in a flow of water. Dairy manure includes a complex mixture of two vastly different materials—water and undigested feed. In the instant invention, each of these constituent components is exploited to produce an effective fertilizer. However, sand adds no value but increases weight and volume of the resulting product. Some dairies use sand as bedding and, thus, in these dairies, the collected manure includes large volumes of sand. Even when sand is not used for bedding, cows will excrete sand from the feed they receive. Cows also track sand into the dairy. In typical embodiments, a gutter system in the dairy will collect sand as well as liquid manure and channel all of it to a primary separator 20. Because sand is generally the densest of the manure constituents, an optional sand lane 14 may employed to remove heavy sediment from the system before further processing.

Typical material proportions for manure from a dairy are such that in 170 lb. of manure having an approximately 40% solid content and a bulk density of about 72 lb./ft$^3$, 115 lb. will be raw manure having 15% solid content and a bulk density of 62 lb./ft$^3$, but that manure will be mixed with 55 lb. of sand at 95% solid content with a bulk density of 110 lb./ft$^3$, Given these exemplary proportions, what sand is held in suspension will not simply settle out of the manure but can float in suspension indefinitely. This suspended sand causes the manure to be highly abrasive when pumped. Removal of some of the sand may be achieved by flow through a sand lane 14 and a reception pit 16; and such use promotes the recovery of that sand bedding while removing abrasive from the handled manure.

The flow of manure through the sand lane 14 allows the less dense organic matter to flow over settling sand in the lane 14. The length of an exemplary lane 14 is selected based upon the size of the expected sand grains; longer lengths are needed for smaller sand grains. Often made of concrete, sand settling lanes 14 are only a few feet in depth, and a typical system will have two lanes to allow alternating use one—idle to provide for drainage and clean out, while the other lane is active to collect sand in use. The dairyman can clean out the idle lane with a front end loader without interrupting operation.

In the presently preferred embodiment, a conventional sand lane 14 receives flush water containing manure. The flow of water and manure is introduced into a shallow, long and narrow channel (lane) at a high delivery rate. An energy dissipation system is usually present at the head end of the lane to slow the velocity of the water and distribute that flow over a width of the sand lane 14. The bottom of the lane 14 in 12-foot-wide lanes, by way of example, conventionally will be sloped at between 0.2 to 0.25 percent. As a result, the flow of water and manure slows to 1 to 2 feet per second in the sand lane 14. The lower speed in the moving flow allows sand to settle out while rinsing most of the organic matter from the sand. The liquid manure with its organic matter continues through the sand lane 14 and may be retained in an optional reception pit 16. The reception pit 16 in the preferred embodiment sits at the lowest end of the sand lane 14, situated to collect manure from the dairy 12.

One advantage to the current configuration, because liquid is such a scarce resource in a dairy, any liquid issuing from the primary separator 20 is also available to be reused as flush water in either of a flush or scrape dairy 12, thereby assuring that flushing can occur at regular intervals and also, by removing some of the liquid fraction from either of the queues feeding either the secondary separator 26 (most often a centrifuge in preferred embodiments) or the MVR 30, each of the two devices can be fed at their optimum rate assuring the most efficient use of mechanical resources. In an optically planned dairy 12, the ability to divert water back for flushing is an extremely valuable design consideration and might, well, conserve construction capital by requiring less capacity overall.

In the presently preferred embodiment shown, a feed pump (not shown) transfers the manure to further separation through a pipe to a primary separator 20. Primary separation may be through any conventional means, for example, by slope separator including a screen such as a wedge-wire screen, or by a rotary separator. Naturally, the purpose of the primary separator 20 is to remove as much of the remaining suspended solids from the manure as possible by the most economic means. Solids removed, for example, by wedge-wire screening need not later to be removed by the far more expensive use of a centrifuge and, thus, preliminary removal has great and positive impact on the economics of manure handling.

One type of primary separator 20 might be selected from any of the family of screen separators (stationary, vibrating, and rotating screen separators). Stationary screens are typically mounted on an incline. The raw liquid manure slurry is pumped to the top edge of the screen and allowed to flow over the screen. Separators of the screen-type generally involve a screen of a specified pore size that allows only solid particles smaller in size than the openings to pass through. Liquids pass through the screen while solids move down the face of the screen and accumulate at the bottom. The system has no moving parts, no power requirements (except for the pump), but is susceptible to clogging and therefore requires diligent maintenance. A vibrating screen consists of a flat circular screen that vibrates. Liquid sluices through the screen while solids that remain on the screen are slowly vibrated to the edges of the screen where they are collected. This system is semi self-cleaning but requires power. A rotating screen consists of a horizontal rotating perforated drum. Slurry is applied at the top of unit as the drum is spinning. Liquids pass through the holes in the drum while retained solids are scraped into a collection area. This design is the most efficient with respect to keeping the screen holes open. Screens typically only achieve solids fractions with moisture contents between 85 to 95%.

A refinement of the continuously turning or rotating screen is the in-channel flighted conveyor screen. The in-channel flighted conveyor screen separator system consists of an inclined screen and a series of horizontal bars, called flighted conveyors. The in-channel flighted conveyor screen can be placed directly in an open manure channel. Such a placement eliminates the need for a sump or a pit and a lift pump. Liquid passes through the screen and drains into the channel on the downstream side of the separator, while the separated solids are deposited on a collection pad. Uses are similar to those of the stationary inclined screen separators, but the in-channel flighted conveyor screen separator requires more mechanical maintenance, as its moving parts are exposed to the corrosive and abrasive constituents of the liquid manure.

A second family of primary separators 20 that may be efficiently employed are known alternately as filters and presses. Filter and press systems press solids with rollers or screws against an opposing screen or belt and typically achieve a higher level of dewatering than screens alone. The three main types are the roller press, the belt press and the screw press. A roller press uses two concave screens and a series of brushes or rollers to squeeze the liquid through the screen. A belt press uses a flat woven fabric that runs horizontally between squeezing rollers. The screw press system consists of a large screw which forces the slurry through a tube and past a cylindrical screen. A plug of manure is formed at the end of the tube. The flow of solids out of the tube is controlled by a set of pressure plates.

Alternatively, a plate press may be employed as a primary separator 20. A plate press relies upon plates position to exploit measured gaps between the plates, rather than pores, to separate solids from a flow of liquid. In another embodiment, filter press used as a primary separator 20 exploits a filter of defined porosity. As in any of these embodiments, smaller particles remain entrained in the liquid flow and larger particles are diverted by the press. Any of these primary separators 20 generally works best with manure having a solids content of less than 5%.

A dewatering screw press is still another example of a primary separator 20. The dewatering screw press includes a screened-cylinder; the dewatering screw accomplishes dewatering by continuous gravitational drainage as the slurry is conveyed through the cylinder. The most common form of a screw press is a design said to have been invented by famous Greek mathematician Archimedes and is known as the screw conveyor. The screw conveyor employs a shaft surrounded by a steel plate configured to form a helical spiral, which when rotated, motivate solids along the cylindrical screen. Gravity presses water through perforations in the wall. As in the case of each of the exemplary primary separators 20 discussed above, a liquid fraction as is removed in the screw press is exploited as a source of nutrients to be concentrated in the MVR 30. A solid fraction is conveyed through the screen cylinder are collected as reclaimed solids 23. Alternatively, the solid fraction is dried by means of a dryer 40 and composted as discussed below.

Some of the solids collected at primary separation may be used for feedstock for the composter and are collected for that purpose. While straw and other highly fibrous organic solids tend to be extremely difficult to compost, there remain within the solid fraction a great volume of organic solids that can be advantageously retained for composting and the method collects these organic solids for later reintroduction into the compounded fertilizer as retained solids 23.

The collection and segregation of straw and highly fibrous solids presents an opportunity for economic gain for the dairyman. For example, the Cornell Waste Management Institute urges the use of dried manure solids as bedding for dairy cattle. "Cornell Waste Management Institute (CWMI) contacted the farms that had been or were starting to use DMS [dried manure solids] as bedding and conducted research on those farms to determine the feasibility of using manure solids as dairy cow bedding. Using manure solids can provide an economic benefit without adversely affecting herd health." Thus, the separated solids may be segregated for use as bedding for cattle.

Another option is to provide those solids for gasification. Gasification is a process that converts fibrous cell wall materials and other organic materials into carbon monoxide, hydrogen and carbon dioxide. This is achieved by reacting the material at high temperatures (>700° C.), without combustion, with a controlled amount of oxygen and/or steam. The resulting gas mixture is called syngas (from synthesis gas) or producer gas and is itself a fuel. The same fuel can be used to power, among other things, the dryers 40 referred to herein for drying manure solids.

While some of the suspended organic solids and nearly all of the sand are removed by the optional sand lane 14, reception pit 16 and, where used, by the primary separator 20, further organic solids may, optionally, be removed from the liquid fraction emanating from the primary separator 20. A secondary separator 26, such as a centrifuge might remove further organic solids from the liquid fraction. A centrifuge is a device which employs a high rotational speed to separate components of different densities. The decanter is a type of centrifuge used for the separation of two or n-phases of different specific gravity; in particular for the clarifying of liquids in which suspended solids are present. The separation of solids and liquids takes place within a cylindrical/conical rotating bowl, drawing the more dense organic solids through the heavy manure to accumulate on the periphery for removal from the resulting light manure. Where a centrifuge is used, the solid fraction retained through secondary separation 26 is highly compostable organic matter and is reintroduced as reclaimed solids 23 into the composter 120 as described below.

Where a centrifuge is exploited as a secondary separator 26, two types of centrifuge are particularly efficacious in a continuous separation configuration to remove the least dense of the organic solids: centrisieves and decanters. Centrisieves consist of an inclined revolving drum that is lined with a filter cloth. The slurry to be separated is pumped into the drum center. The liquid leaves the drum through the filter cloth and the organic solids move by centrifugal force to the edge of the drum where they are removed separately. In the case of decanter centrifuges, an auger, turning at a slightly higher or slightly lower speed than the cylinder in which it is contained, moves the slurry to a conic part of the vessel, where it is discharged. While an initially high capital investment and while the energy requirement is also quite high in comparison to other systems, the decanter centrifuge, however, is considered as quite efficient and has earned its place as the workhorse of a wide range of liquid/solid separation activities. Its application to the dewatering of manure has made it a most valuable tool in animal husbandry.

A low temperature dryer 40 may, optionally, be used to make the product easier to handle. The type of dryer 40 can be selected from a number of available devices. The specific dryer 40 will be selected to use one of a variety of fuels or to exploit waste heat to perform the drying process. The dryer 40 in a preferred embodiment is a gas-powered dryer 40 where high moisture solids are drawn past radiant heaters on a motorized conveyor 42 allowing drying of the organic solids to a desired state of dryness. In a preferred embodiment, the dryer 40 will dry the solid fraction from about 70% moisture manure down to a. usable range of between 0-40%. The art of drying organic solids is known and further explanation here is not necessary to those having skills in the art.

The liquid fraction previously separated from the organic constituents of the manure is received at the MVR 30. The MVR 30 allows the concentration of nutrients in one flow, termed herein "nutrient concentrate" and produces a second flow containing nearly pure water. As used herein, the MVR 30 is exploited as, essentially, an evaporative process driving off most of the water and dissolved ammonia while retaining the solid nutrients as a nutrient concentrate 36. Typically, an MVR 30 can concentrate manure by as much as 20:1, though more typical is 8 or 10:1. While some of the nitrogen present leaves the MVR 30 as ammonia dissolved in water, that nitrogen can be recovered by reacting as ammonium sulfate. In contrast to conventional separation techniques and mechanisms, nitrogen is retained as ammonia in solution or as gas entrained in water rather than driven off as ammonia gas into the ambient atmosphere.

Figure 3:
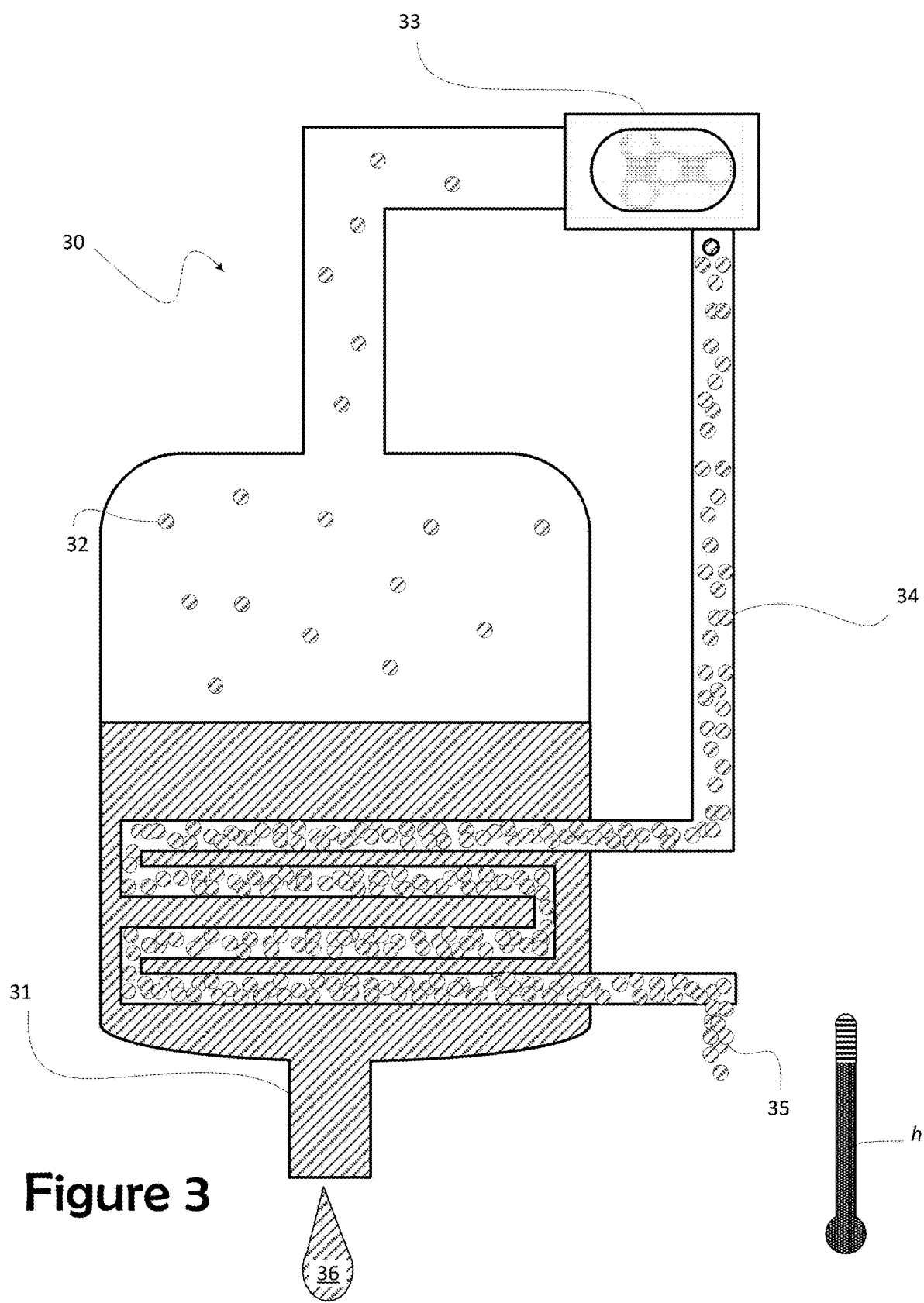
FIG. 3 depicts the operation of a mechanical vapor recompression evaporator ("MVR")

For a quick overview of evaporation, FIG. 3 presents the MVR 30. As practiced herein, the invention's mechanical vapor recompression in the MVR 30 is an energy recovery process. Liquid manure enters the MVR and pools as a liquid-phase slurry 31. What water exists in the slurry 31, which, at this point, has very few solids suspended in it, is readily heated to evaporate water off as a vapor 32. Such evaporation is accelerated by heat escaping through a heat exchanger from the recompressed vapor 34 (the heat exchanger depicted as coils herein). In the presently preferred embodiment, that water vapor is produced at less than atmospheric pressure (allowing the evaporative phase change to occur at lower temperatures), driving off a significant portion of the contained water, thereby concentrating the nutrients significantly. (in a preferred embodiment, the pressure over the slurry is maintained at least 4 inches mercury (Hg) below atmospheric pressure, though a higher vacuum could be used successfully or might be used to initiate the process and then to run at 4 inches of Hg.) The system exploits the vapor pressure of the contained water to rapidly evaporate that contained water, Vapor pressure or equilibrium vapor pressure is defined as the pressure exerted by a vapor in thermodynamic equilibrium with its condensed phases (solid or liquid) at a given temperature in a closed system. The equilibrium vapor pressure is an indication of a liquid's evaporation rate, in this case that of water. By confining the slurry 31 at these low pressures, the water vapor 32 readily leaves the slurry 31. The mechanical compressor 33 draws away this vapor 32 on its intake side, advantageously, maintaining the relatively low pressure in the vessel of the MVR 30.

The vapor 32 is then compressed by a mechanical means. The compressor 33 (in a presently preferred embodiment by a roots-type compressor) by compression adds energy to the vapor 32 and concentrates what energy the vapor 32 contains. This added energy is carried as heat h in the compressed vapor 34. The now-smaller volume of vapor, i.e. the compressed vapor 34, has been driven to a higher temperature and pressure, thus, a higher energy state. Since the pressure increase of the vapor also generates an increase in the condensation temperature, the same vapor then serves as the heating medium for its "mother" liquid, i.e. the liquid manure slurry 31 being concentrated. As described above, energy escaping the compressed vapor 34 through the heat exchanger heats the slurry 31 to liberate the vapor 32.

It is instructive to look at this transfer of energy from the compressed vapor 34 to the slurry 31. Commonly called a heat exchanger, the coils that contain the compressed vapor 34 hold that vapor 34 in thermal proximity to the slurry 31. Energy migrates as heat through the exchanger, to the mother liquid, the slurry 31. A heat exchanger is a device designed to efficiently transfer or "exchange" heat from one matter to another.

Operation of the evaporative MVR 30 is as an open heat pump system. Through compression, both pressure and temperature increase, together with the corresponding saturation temperature. The required compression energy is very small compared to the amount of latent heat present n the recycled steam. As a result, otherwise pure water (containing dissolved ammonia gas) is evaporated off as water vapor 32 and leaves the slurry 31 to produce a highly concentrated soup of the remaining nutrients the liquid manure contained (without the nitrogen that left as ammonia gas), i.e., the nutrient concentrate 36.

To summarize the operation of the MVR 30, compression at the compressor 33 simultaneously increases both the pressure and the temperature of the vapor 34 on the downstream side while dropping the pressure in the vessel to hasten the escape of water from the slurry 31 as vapor 32. Heat of compression is drawn off at a condenser from the vapor 34 to facilitate condensation of the nutrient concentrate in the slurry 31. The transfer of energy from the compressed vapor 34 causes ammonia laden water vapor that evaporated out of the slurry to then be condensed to ammonia-laden water 35 giving up heat to drive more water vapor off of its "mother fluid", the slurry 31. Importantly, because the slurry 31 and the compressed vapor 34 do not come in contact one with the other, the differences in pressure between the low side of the compressor 33$j$ (i.e. the vessel containing the slurry), and the high side of the compressor (i.e. the compressed vapor 34 condenses), can be optimized based upon the energy transfer through the heat exchanger. The energy is transferred as a consequence of the temperature differences between the two fluids. Compression by the compressor 33 drives the vapor 34 to a high temperature and this high temperature transfers to walls of tubes in which the compressed vapor 34 is contained. These heated tubes, in turn, heat the slurry 31, driving off ammonia-laden water vapor 32 which is drawn into the compressor 33.

Advantageously, while some heat migrating from the compressed vapor 34 through the heat exchanger heats the slurry 31, a great deal of heat h continues to reside in the ammonia-laden water 35 as it is drawn off from the vessel. This residual heat h keeps the condensate at an optimum temperature to facilitate removal of ammonia in ammonia stripping vessel 37. The retention of this heat h provides a synergy with the operation of the ammonia stripping vessel 37.

Other means may also be used to exploit process heat provided by the MVR 30. For example, in the operation of the ammonia stripping vessel 37, rather than allowing heated air to escape from the stripping vessel 37, air may, optionally be retained and recycled as a closed-loop of the air flow within the stripping vessel 37. This recycling of air can be used to further conserve process heat. In other embodiments, an open-loop might include a heat exchanger to retain the thermal energy in the air flow. Also, a heat exchanger can be employed at the exit from the MVR 30 to draw more heat from the nutrient concentrate 36 as it is drawn from the vessel. Otherwise, heat retained in the nutrient concentrate 36 simply hastens drying times. Exploiting either of these methods can be used to maintain an optimum stripping temperature, contributing to efficient operation of the stripping vessel 37. Because the MVR 30 is the source of the heat, these methods also exploit the synergy to be found in joint operation of the MVR 30 and the stripping vessel 37.

Returning to FIG. 1, in the condensate 35 leaving the MVR 30 and entering the ammonia stripping vessel 37, ammonium ions exist in equilibrium with ammonia gas. Ammonia exists in the condensate both as dissolved gas ($NH_3$) and in true solution as an ion ($NH_4^+$). The ammonia stripping vessel 37 provide an environment in which to shift the conditions of heat, acidity, and pressure to create an selected equilibrium within the tower, an equilibrium to favor the liberation of ammonia as a gas. Thus, because the condensate 35 can be maintained at the elevated temperature leaving the MVR 30, the chemical equilibrium can be shifted to favor liberation of ammonia gas within the first of the stripping vessels 37.

There are generally two towers used in conjunction to form the stripping vessel 37. In the presently preferred embodiment, air is used much like a conveyor belt to carry, ammonia gas through the stripping process. The air is forced through the first of the stripping towers to harvest the liberated ammonia gas, entraining it and carrying the ammonia gas to the second of the stripping towers where ammonia gas is removed as ammonia sulfate. Now-pure water droplets, having given up their ammonia, gas, pool at the base of the first of the stripping towers. This water is, then, drawn off and is stored in a reservoir such as a storage lagoon 38 (FIG. 1) for use as clean water in the dairy 12. Meanwhile, the flow of air carries the entrained ammonia gas into the second of the stripping towers for chemical reaction there, in the preferred embodiment.

The second of the stripping towers serves an absorber capturing the gaseous ammonia as ammonium sulfate. Ammonia gas meets a mist of sulfuric acid which, by chemical reaction, forms ammonium sulfate (a valued nitrogen-laden fertilizer). Still bearing a great deal of process heat h, with the ammonia removed, in one embodiment this flow of clean air may be returned to the first of the stripping towers, there to entrain more ammonia gas.

Ammonia stripping occurs at the surface of droplets of the condensed water vapor 35. The surface of the condensate 35 is the interface between water and air and ammonia gas leaves through that surface. The condensate 35 is sprayed into he above-described forced air flow within the first of the stripping towers. A presently preferred embodiment of the invention, structures are placed in the first of the stripping towers to break up the condensate 35 into small droplets to enhance the volume of gas escaping. In this embodiment, the first of the ammonia stripping towers includes internal packing configured to break up the sprayed condensate 35 into fine droplets. Breaking the condensate 35 into droplets gives the ammonia more opportunities to escape per unit volume. (The smaller the droplet of water, the greater the ratio between the surface area and the volume of the droplet.)

Because the surface tension at the air-water interface is at a minimum when the water droplets or surface films are being formed, the transfer of dissolved gas from the liquid to gas entrained in the air flow is at a maximum at this instant. The greater the heat h the droplets contain, the greater the energy of the dissolved gas as it strikes the surface from the interior of the water droplet. Then, much as a rocket escapes the gravitational pull of earth, the gas molecule escapes the condensate 35 to be entrained in the air flow.

In the preferred embodiment, distinct towers are employed for the separate actions of liberating the ammonia gas from the condensate and the transformation of the ammonia gas into ammonium sulfate. Because these two actions could be performed in a single structure and because the flow of air is most advantageous when the two actions are performed in close proximity one to the other, the inventors have expressed the ammonia stripping vessel 37 as a monolithic element of the invention even though they will be configured as separate chambers within the monolith. Thus, in the preferred embodiment a first and a second stripping tower, both expressed as the vessel 37 are used to reclaim the ammonia from the condensate 35.

As stated above, the output of the second of the stripping towers is ammonium sulfate and water. Ammonium sulfate is a two-in-one fertilizer. In its crystal form with a 21-0-0 analysis, ammonium sulfate is one of agriculture's oldest solid forms of fertilizer. Ammonium sulfate is a quick acting form of water soluble nitrogen that stimulates vegetative growth and produces deep green color. Additionally, ammonium sulfate, as it reacts with the soil, liberates high volumes of sulfur to enhance decomposition of thatch that might reside within the soil. Sulfur available within the thatch stimulates growth of micro-organisms enhancing decomposition. Decomposition of the vegetable matter liberates other nutrients then available to fertilize crops along with the nitrogen collected from the ammonia, thereby improving color and density of the plants fertilized, for example, turf. Also, in addition to being nitrogen-rich, ammonia will reduce the amount of acid present in the decomposing thatch and, at a more neutral pH, enhances the action of composting organisms (referred to collectively, herein, as "aerobic thermophilic microorganisms" or "ATM") 130 accelerating decomposition. Ammonium sulfate can be selectively added to the feedstock of the composter 130 (FIG. 2) to accelerate decomposition that occurs therein.

The major microbiological components of compost are bacteria and fungi. In addition, actinomycetes, while a particular type of bacteria, are considered as a distinct third major component classified for their enhanced ability to degrade the more recalcitrant compounds. Actinomycetes can be found mostly in soil and decaying organic matter, as well as in living organisms such as humans and animals. They form symbiotic nitrogen-fixing associations with over 200 species of plants, and can also serve as growth promoting or biocontrol agents, or cause disease in some species of plants.

Figure 2:
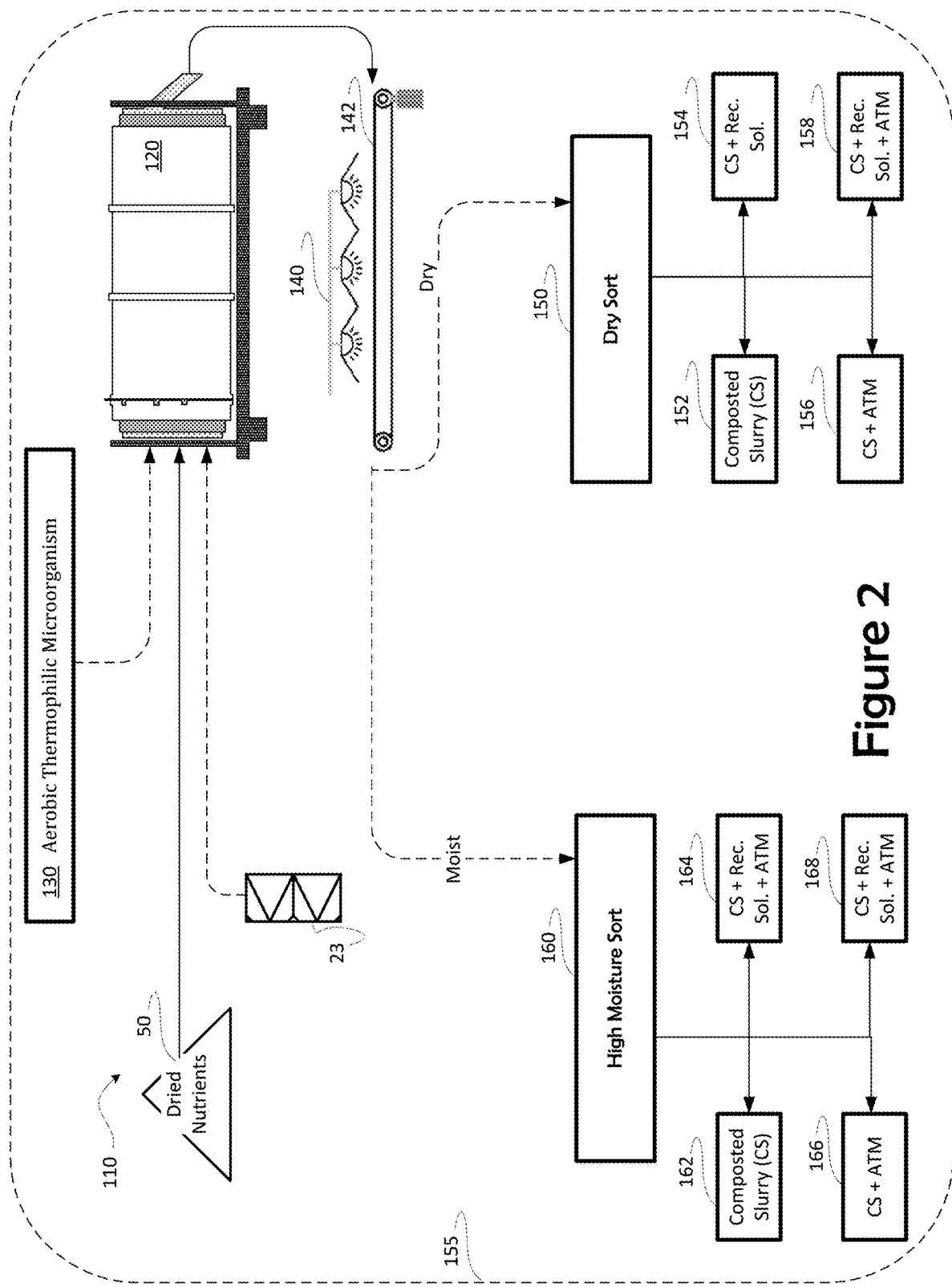
FIG. 2 depicts a method and system for composting and compounding organic solids, nutrient concentrate and aerobic thermophilic microorganisms in various proportions to produce fertilizer.

As the discussion leaves FIG. 1 in favor of FIG. 2, it is important to note that in transition, apart from the retention of ammonium sulfate, there are two intermediate products the system 10 and method has produced: 1) reclaimed solids 23 at a selected state of dryness, i.e. either wet or dry as needed; and 2) supply of dried nutrients in a thickened broth-like liquid. These two constituents can be compounded to produce superior fertilizer in either of dry or wet form and according to desired fertilizer nutrient levels. As discussed above, reclaimed solids 23 may, optionally, be added as an amendment to improve the filth structure of soil. FIG. 2 is provided to demonstrate a composting system 110 to exploit these three products of the system 10 and method demonstrated in FIG. 1. Thus, the compounding system 110 shown in FIG. 2 presents the formulation of fertilizer from these three manure constituents.

While the composting of organic solids is not a necessary step in the instant inventive system and method, the benefit of composting of organic solids is widely known. Composting is selected to be included in the preferred embodiment of the invention to exploit the products of the system 10 in a highly bioavailable state. Importantly, any mixing of the constituent portions of reclaimed solids 23, dried nutrients 50 and introduction of ATM 130, even to the exclusion of one or another of the constituents, might occur using any mixing facility. Nonetheless, composting is the preferred method and presented, here, in the preferred embodiment of the invention. All the discussion herein relating to the mixing of the constituents to form fertilizer will be presented in the nonlimiting exemplary context of composting. Again, however, the invention may be practiced without such composting, substituting the mere act of mixing and blending of selected quantities of two or three of the constituents.

In a further and optional embodiment, ammonium sulfate, formed in the stripping vessel 37, may be added to enhance nitrogen content in the compost and to further facilitate the rapid decomposition of included organic solids, where present. The selective addition of ammonium sulfate results in the shifting the analysis composition of the resulting fertilizer. Thus, by selective combination of the several constituents recovered prior to composting, "designer" manure-based fertilizer emerges, compounded within the composter.

In reducing the invention to practice, the inventors have found that the Daritech® BeddingMaster® has been advantageously employed as an in-vessel composter 120 to compost organic matter and well configured to receive the inoculation of aerobic thermophilic microorganisms ("ATM") 130 to further facilitate biological decomposition of the organic matter within the dried nutrients 50. This is not to say that other available composting mechanisms would not serve the ends of the invention, formulating fertilizer from the constituent parts, i.e. reclaimed solids 23, dried nutrients 50, and ATM 130, but rather to assert that the BeddingMaster® has proven to be a suitable mechanism for such compounding, assuring appropriate results.

Generally speaking, the dried nutrients 50, in the system 10 as also shown in FIG. 1, have only been dried to a minimal degree to serve as feedstock for the composter 120. By way of nonlimiting example, the nutrient concentrate 36 is made up of nutrients and some organic manure solids of approximately 35% dry matter. Because the MVR 30 is the principal means of dewatering the nutrients, no significant amount of nitrogen volatilization occurs. In most instances, the dried nutrients 50 will retain the aerobic flora necessary to consume the organic matter then introduced into the composter 120. Once inside the composter 120, those flora (many of the same as those in the ATM 130) proliferate as they finish the job begun in the cows' stomachs. During composting, a blower pulls air through the drum, ensuring an ample air supply. This supplied air mixes with the solids that are tumbling from the rotation of the drum allowing respiration. Within just a few hours, the activity of the bacteria will bring the temperature to over 150° F. where it stays as the material moves through the composter 120.

In movement of dried nutrients 50 through the composter, a greater population of these same microbes can accelerate and enhance composting. Also, the population of these microbes can encourage further decomposition of organic matter in soil, when the composted product is applied. By inoculation from a reservoir of ATM 130 prior to composting, a more valuable product emerges as the composter output have an enhanced population of ATM microbes as well as a supply of organic solids that are more completely digested and can supplement tilth structure in soil. To secure this beneficial enhancement of native soil, an ATM inoculation 130 is provided for as an optional addition to the dried nutrients 50.

Feedstock to the composter 120 includes dried nutrients 50. Additionally, dried organics in the form of the earlier-described reclaimed solids 23 may be introduced to enhance the mixture in selected proportions. As described above, ATM 130 can also be added in selected proportions to achieve a selected mixture. Importantly, as noted above, the combinations of these three can be varied, even to the exclusion of one or another in order to provide distinct products. By varying proportions of the constituents (dried nutrients 50; reclaimed solids 23 and ATM 130) the composter 120 will produce distinct fertilizer products and, as such, the output of the composter 120 can be readily predicted and identified.

Drying and sorting of composted product as distinct types of organic fertilizer occurs within a module whose elements may be collectively referred to herein as the "Organic Fertilizer 155" module. When used herein, the Organic Fertilizer module 155 shall refer to the whole of the drying and sorting process from which several types of organic fertilizer emerge. Thus, as the composted product emerges from the composter (as discussed above), the drying of the product makes its handling and storage easier. By knowing the precise formulation of nutrients and microbes introduced into the composter, the resulting product is readily categorized. Generally speaking, the agricultural industry has channeled its demand for fertilizer into two levels of dryness described generally as "moist" and "dry." Moist fertilizer has a solids content ranging from 40-70% and may be alternately described as "high moisture content" fertilizer. A second category is referred to as "dry" and is generally categorized as about 85% solids or greater.

Moist fertilizer is preferred when the product is to be used near the dairy. The benefits of drying manure include imparting a greater ease in handling and transportation of the resulting fertilizer. However, because of nutrient volatilization under heat and the cost of energy to run a dryer 140, the moist fertilizer is generally economically desirable over dry fertilizer where transportation is minimal or storage is not required. As transportation costs mount or where extended storage is desired, for example, for sites further removed from the dairy, the slight degradation of nutrients due to drying is not a significant enough factor to overwhelm the ease of handling or transportation. Thus, state of dryness is selected to meet the needs of the ultimate user. In accord with the customs of the industry, product is sorted to either of a dry moisture sort 150 or a high moisture sort 160.

As discussed above, the composted product can include any combination of additional constituents (dried nutrients 50; reclaimed solids 23 and ATM 130) added to the feedstock in order to produce distinct products. Where no additional constituents are added, the concentrated nutrients from the slurry, i.e. the dried nutrients 50, are composted and dried produce either of a dry composted fertilizer 152 or wet composted fertilizer 162. Where additional organic content is desired, the reclaimed solids 23 are included in the composter 120 feedstock and yields greater volume of product as either dry fertilizer 154 or moist fertilizer 164. When these same dried nutrients 50 have been inoculated with ATM 130, the dry fertilizer 156 or the wet fertilizer 166 carry these ATM to enhance and decompose additional organics the soil contains. Finally, in accord with the needs of prospective customers, both the additional organics contained in the reclaimed solids 23 and the additional ATM to break down those additional reclaimed solids 23 yields an enhance fertilizer product in either of dry 158 or moist formulation 168. Each of these products has a separate market and production can be controlled by the selective addition of constituents to the composter feedstock.

So, once feedstock constituents are selected to produce a needed fertilizer profile, the desired product or products emerge from composter 120 for drying on the conveyor 142 under the dryer 140. As expressed above, drying may be achieved under any suitable dryer 140, though in the presently preferred embodiment, the dryer 140 is powered by gas. In such a manner, product that emerges as a made-to-order fertilizer from constituents produced at the dairy 12 site. Because manure is a necessary by-product of the dairy operation, the use of the MVR 30 evaporator in thermal conjunction with the ammonia stripping vessel 37 facilitates the dairyman's economic exploitation of these manure by-products.

Figure 4:
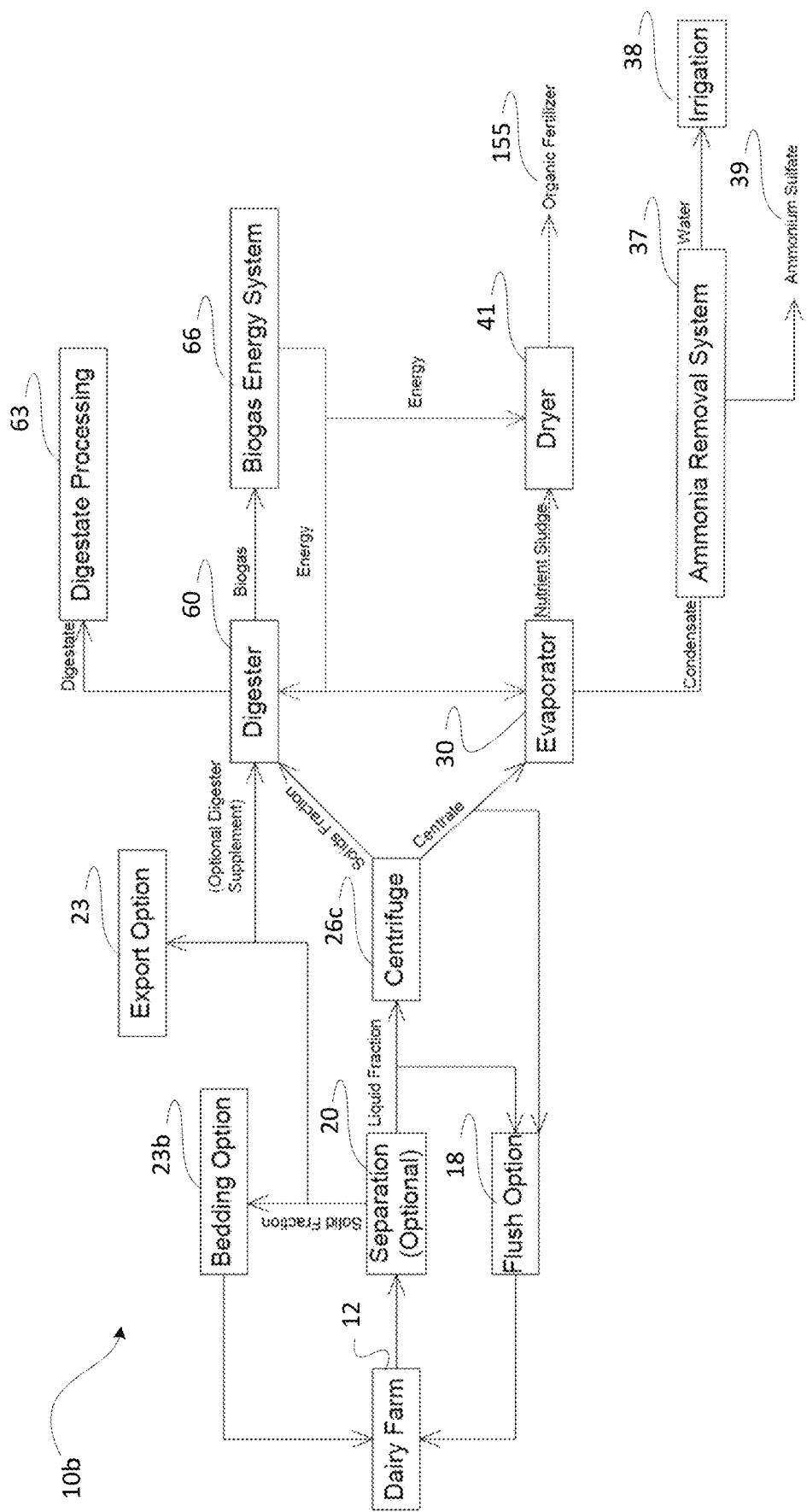
FIG. 4 depicts a specific embodiment of the invention configured to exploit the combination of the centrifuge and MVR to produce a volume of biogas.
Figure 5:
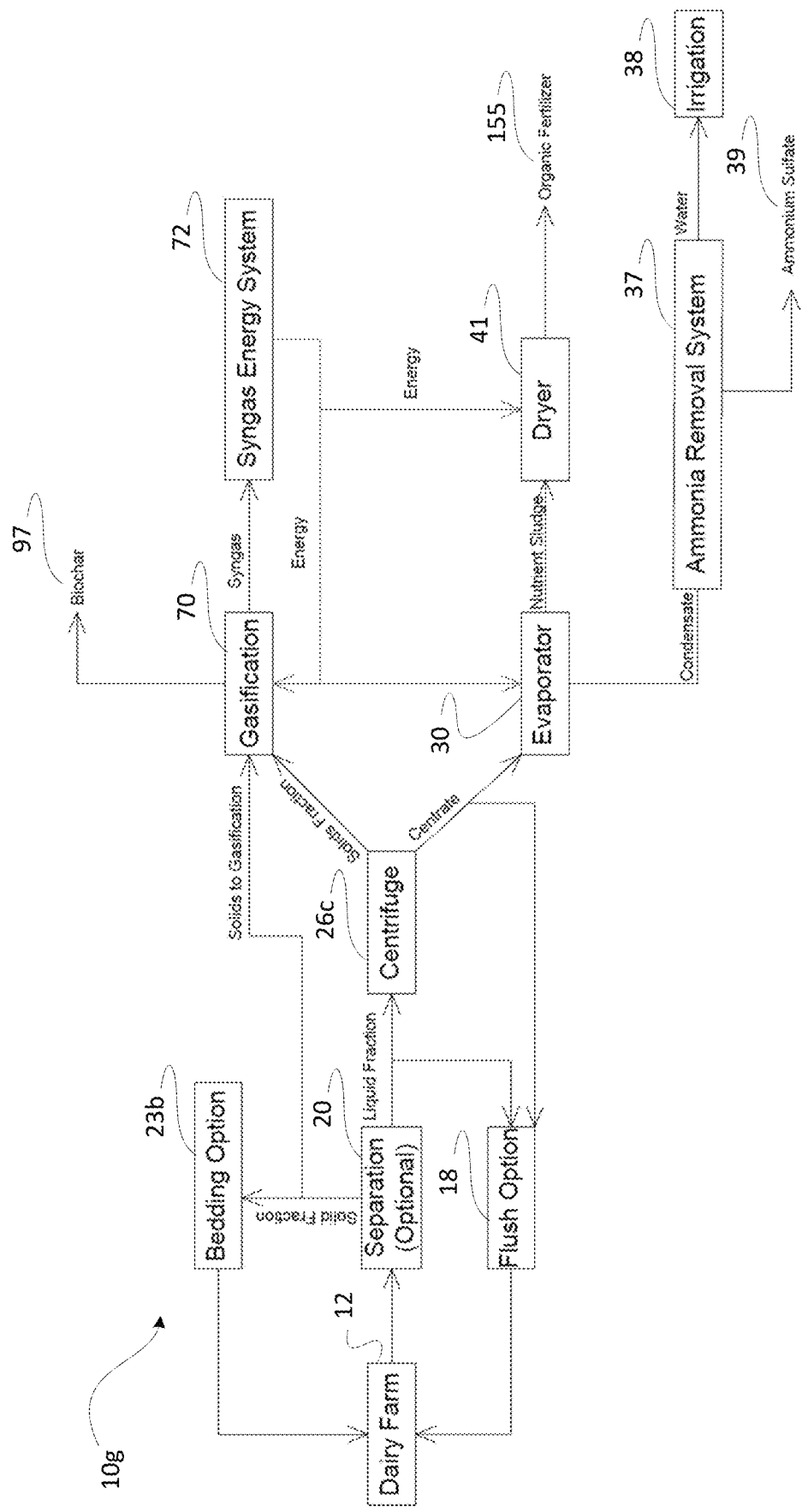
FIG. 5 depicts a specific embodiment of the invention configured to exploit the combination of the centrifuge and MVR to produce a volume of syngas.

In practice, a certain synergy has been noted when the centrifuge is used as the secondary separation 26 process (FIGS. 1, 4, and 5). The high nutrient content of the liquid fraction emerging from the centrifuge as secondary separation 26 process facilitates production of a generally more robust organic fertilizer. Nutrients exist in two forms in manure: first, the greater majority are held either in solution or as tiny particular in a colloidal suspension in the manure; and second, in larger particulate forms that reside in the solid fraction of the manure. Because they are so fine and readily pass through primary separation, many of the finer particles of nutrient are traveling suspended in the liquid fraction. The centrifuge 26c turning at high speeds will readily separate the larger particles of these nutrient particles from the ammonia and other nutrients in solution, while the smaller suspended nutrient particulates remain in colloidal suspension within the liquid fraction.

Because the centrifuge 26c will segregate the larger particulate along with the denser fibrous organic matter, the solid fraction emerging from the centrifuge 26c provides an ideal feedstock for either of the gasification or digestion processes described below. To the extent that some of the nutrients do leave the centrifuge 26c in the solid fraction, either in solution in what moisture remains in the solid fraction or as nutrient particulate, the loss of these nutrients, in comparison with the nutrient content in the liquid fraction, is negligible and to some extent can facilitate decomposition of that material through either of biological digestion or gasification.

In order to describe the two preferred methods and systems used for decomposition of these solids (the biogas extraction process 10b (FIG. 4) and the syngas extraction process 10g (FIG. 5)), reference to the general case and system 10 depicted in FIG. 1, will exploit the commonality of each. The common elements having their reference numbers as showing in FIG. 1 shall be addressed with the same reference numbers in each of FIGS. 4 and 5. The common reference numbers apply equally to each, for example the MVR 30, is common to each process and its role identical. Further, where the same reference number is used in either of the biogas extraction process 10b (FIG. 4) or the syngas extraction process 10g (FIG. 5) as is used in FIG. 1 or, where applicable, FIG. 2, the use and the output are identical to that as explained in reference to either of FIG. 1 or 2. Omission of a similar discussion at this juncture is not an omission, rather simply to avoid repetition in the Specification.

Nitrogen and phosphorus are present in manure as incorporated in various inorganic and organic compounds. In livestock farming, usually not more than 5-45% of the nitrogen (N) in plant protein is transformed into animal protein, depending on the type of animal and livestock management techniques employed. The remaining 55-95% is excreted in urine and dung as organically bound nitrogen. Following deposition on the dairy floor, a major fraction of the organic nitrogen is rapidly hydrolyzed into ammonium by the enzyme urinase, which is present in the feces.

Because a significant amount of the elemental phosphorus may reside in the manure as suspended particulate, in the course of centrifugation, that phosphorus also comes out of the manure in the solid fraction. Advantageously, however, the ammonia in the manure (which is the nitrogen-bearing compound) as well as the dissolved phosphorus and the potassium stay in solution and therefore remain in the liquid in spite of the influence of the centrifuge 26c. A small portion of each, however, remains in the solid fraction emerging from the centrifuge 26c as particulate and, because that solid fraction still carries moisture, the ammonia and potassium are also in solution in such moisture as remains in the solid fraction of the manure.

Phosphorus is an essential element classified as a macronutrient because of the relatively large amounts of phosphorus required by plants. Phosphorus is one of the three nutrients generally added to soil as fertilizer; these three primary nutrients are nitrogen (N), phosphorus (P), and potassium (K). One of the main roles of phosphorus in living organisms is in the transfer of energy. Organic compounds that contain phosphorus are used to transfer energy from one reaction to drive another reaction within cells. Adequate phosphorus availability for plants stimulates early plant growth and hastens maturity.

Phosphorus is fed to the animals via plants, but may also occur as feed additives in the form of inorganic phosphate. Cattle are able to use phosphorus very efficiently and only the plant phosphorus that is not mobilized and adsorbed in the digestive system is excreted in feces and very little in urine. In slurry over 80% of the dissolved phosphate is orthophosphate.

Because manure from the dairy 12 (FIGS. 1, 4 and 5) is a mixture of feces and urine, bedding material (e.g. straw, wood shavings, sawdust, sphagnum), spilt feed and drinking water, and water used for washing floors, getting the inert and macroscopic inclusions out of manure is generally favored in each of these preferred embodiments though use of a primary separator 20 is not necessary. Advantageously, removal of these inclusions prevents extensive chemical interaction which might shift pH in the manure and, therefore, through a buffering reaction, shift the nitrogen and phosphorus proportions in the manure. Factors of importance for optimizing the efficiency of slurry separation include particle size, concentration of organic and inorganic components, and the pH and buffer systems contained in the manure.

Manure is a colloidal suspension of nutrients in solid phase as well as carrying nutrients in solution. A colloid is a mixture in which one substance of microscopically dispersed insoluble particles is suspended throughout another substance. Unlike a solution, whose solute and solvent constitute only one phase, a colloid has a dispersed phase (the suspended particles) and a continuous phase (the medium of suspension). To qualify as a colloid, the mixture must be one that does not settle or would take a very long time to settle appreciably. Generally, chemical separation is based upon addition of reagents to precipitate nutrients from the manure, but those reagents may require later removal in order to manufacture fertilizer. Mechanical separation of particulate can extract most of the nutrients as they are carried with the liquid fraction without precipitating them by distinct chemical reactions. Centrifugation is such a mechanical separation.

In manure, some of the nutrients reside as dispersed-phase particles having diameters between approximately 1 and 1000 nanometers. Such particles are normally easily visible in an optical microscope, although at the smaller size range (r<250 nm), an ultra-microscope or an electron microscope may he required. The centrifuge 26c (FIGS. 4 and 5) has proven to be a particularly effective secondary separator. The centrifuge 26c will preferentially separate solids from the liquid fraction.

Particle size distribution in the manure is important for separation; for example, filtration will only retain particles above a certain size and, during sedimentation, particles in the range between 1 nm and 1 μm (i.e. colloids) are subject to Brownian motion and move by diffusion in the liquid, and therefore settle very slowly or not at all. Liquid-phase phosphorus is not removed by centrifugation even if solid particulate phosphorus is.

Dairy manure naturally contains phosphorus in the form of struvite and apatite (hydroxyapatite) crystals setting up the buffer discussed above. Because manure contains struvite or the inorganic components contributing to the formation of struvite crystals, there is phosphorus readily available to move to solution as the pH shifts. Thus, physical and chemical changes in manure slurry may initiate or inhibit further struvite formation. The formation of struvite crystals poses a further problem in biogas plants because struvite will build up on pipe surfaces and reduce the capacity of slurry transport, but struvite formation may also be used to remove dissolved phosphorus and ammonium from the slurry. Such crystallization of phosphate is used to facilitate the sedimentation of phosphorus in processes that exploit chemical rather than mechanical removal phosphorus as particles. As such, the use of a centrifuge to remove precipitate alters the chemical makeup of the manure less than removal of phosphorus by any form of chemical reaction.

Although some charge repulsion might be present, attractive forces are also significant, with other forces such as gas buoyant threes present within manure preventing attractive forces from being realized. For this reason, merely screening manure will not give the separation that centrifugation can achieve. For example, employing a decanter centrifuge alone can result in nearly 60% total phosphorus removal..

Centrifuges 26c are capable of extracting phosphorus from dairy manure because most of the phosphorus in manure is bound to small solids. By using high speeds to create centrifugal force, centrifuges 26c separate solids from liquids, extracting phosphorus from dairy manure into a solid product. It has been shown that phosphorus in the compostable solid fraction can enhance the action of aerobic thermophilic microorganisms 130 (FIG. 2). As such, the phosphorus can facilitate decomposition of fibrous vegetable matter 23, which when dried at the dryer 40 provides a dried nutrient base for composting and the resulting fertilizer having all of the retained phosphorus., Using the centrifuge 26c to mechanically remove fibrous solids and such nutrients as remain in the solid fraction, prior to subjecting the liquid fraction to the MVR 30, optimizes nutrient recovery from the liquid fraction. Removal as preferred herein minimizes chemical degradation of nutrients within the liquid fraction. Oxic degradation of organic material reduces the content of acids in solution and thereby increases pH. In contrast, anoxic processes will contribute to the formation of organic acids and thereby reduce pH. In an anoxic environment, the content of organic acids may be reduced by methanogenic microorganisms by transformation into $CH_4$ and $CO_2$ which, in contrast, will increase pH. In short, selective removal of either one of nitrogen or phosphorus may adversely affect the selective removal of the other. This fact explains the special utility of centrifugation in combination with the MVR evaporation,.

Referring now to FIG. 4, the method 10b includes a digester 60 for producing biogas. Digesting is the process of liberating carbon that had been fixed in the organic feed to the cattle by photosynthetic organisms; plants capture solar energy using water, atmospheric $CO_2$, and soil nutrients. To feed the digester 60 (and the microorganisms operating therein), the solid fraction from the centrifuge 26c is conveyed into the anaerobic digester 60. A collection of natural bacteria feed on the organic matter present in the solid fraction, allowing the bacteria to produce simpler intermediate compounds that are eventually converted to leave the digester 60 as a digestate for digestate processing 63 or as biogas. The biogas is insoluble and leaves the digester 60 in its gas phase and is removed from the digester 60 through piping that conveys it for storage or final use in powering, for example, the dryer 41 or warming the digester 30 itself.

An anaerobic digester 60 is a sealed, heated tank which provides a suitable environment for naturally-occurring anaerobic bacteria to grow, multiply, and convert the solid fraction to biogas and a low-odor effluent. Because there is no volume reduction with anaerobic digestion, the same amount of material added daily to the digester is also removed daily. While manure is flowing through the digester, the bacteria convert organic matter to biogas and effluent.

Anaerobic bacteria transform manure and other organic material into biogas and a liquefied effluent during three recognized stages of biogas production. In the liquefaction stage, liquefying bacteria convert insoluble, fibrous materials such as carbohydrates, fats and proteins into soluble substances. However, some fibrous material cannot be liquefied and can accumulate in the digester or can pass through the digester intact, Undigested materials make up a low-odor, liquefied effluent. Most of the liquified, soluble compounds are converted to biogas by the acid- and methane-forming bacteria during steps 2 and 3 of biogas production. In the second stage of anaerobic digestion, acid-forming bacteria convert the soluble organic matter into volatile acids—the organic acids that can cause odor production from stored liquid manure. Finally, methane-forming bacteria convert those volatile acids into biogas—a gas composed of about 60 percent methane, 40 percent carbon dioxide, and trace amounts of water vapor, hydrogen sulfide, arid ammonia. Not all volatile acids and soluble organic compounds are converted to biogas; some become part of the effluent or digestate.

The prior use of a primary separator 20, removes solid particulate from the manure. Without the prior use of the primary separation 20, less dense undigestible material such as bedding or animal hair contained in the manure enter the digester 60 and float to the top of the digester 60, forming a crusty scum, and denser insoluble material such as dirt can settle to the bottom. Such settling reduces the effective volume of the digester and can cause incomplete digestion and odor problems, while crusting can keep gas from escaping the surface of the digesting manure. In this preferred method, the use of the primary separation 20 assures that a more homogenous and digestible medium enters the centrifuge 26c and, thus, a more uniform solid fraction is fed to the digester 60.

Using the centrifuge 26c prior to feeding the digester 60 allows the concentration of solids to be handled by the digester 60. As such, concentration of solids comprises an enhanced feed for the digester 60; enhances describes the greater energy density being fed to the microorganisms within the digester 60. Another advantage of the enhanced, concentrated feed to the digester 60 is that such water as is needed for operation of the digester 60 is minimized because a greater volume solids entering the digester 60 are digestible (in contrast to the conventionally-fed digester). Also, with such an enhanced energy feed, in the manner of this preferred embodiment 10b of the invention guarantees that no living pathogen will leave the digester because only digestible matter will be in the digester 60 and will only leave as entirely, digested digestate to be handled in digestate processing 63. Importantly, the digester 60 effectively, kills all pathogens in the manure, and because of prior separation, very little phosphorus or nitrogen that might leach out into runoff water remains in the digestate.

To further control settling and scum formations, material in the digester can, optionally, be agitated by a slurry pump, a mechanical stirrer, or strategic placement of the heating pipes. Slurry pumps are an effective way to keep material in the digester well-mixed. Mechanical mixing adds complexity to the system, but can aid thermal uniformity, reduce settling, and break up crust formation. Mechanical mixing may be necessary for certain manure handling systems such as flush systems where solid and liquid portions may separate easily into distinct layers within the digester. Strategic design choices dictating placement of the heating pipes will encourage thermal circulation and, thereby, reduce settling problems.

The heating system is a critical part of the anaerobic digester. Heating pipes in which hot water circulates must be able to heat all material entering the digester to 95° F. and to resist corrosion from manure. The flush option 18 assures that the centrifuge 26c receives only a constant and selected volume of liquid manure assuring a constant flow from the dairy 12 to the digester 60 through the centrifuge 26c. Because of this constant flow, thermal losses due to storage minimizes external heating requirements. Advantageously, the produced gas is available to inject heat into any of the several processes such as the MVR 30, the ammonia stripping towers 37 or either of the digester 60 or gasifier plant 70.

Biogas is collected in the head space of the anaerobic digester 60 and has about 60 percent of the energy density of natural gas (methane)—about 600 BTU/ft$^3$ and is distributed through the system 10b through a biogas energy system 66 used for exploiting the energy content in the gas. With minor equipment modifications, biogas can be used in the same applications as LP gas, propane, or natural gas. Most importantly, the resulting biogas can used both to heat the digester 60 and the dryer 40. Biogas is best suited for stationary continuous operation because of its low energy density, the corrosive nature of some of the impurities and the constant production rate. Biogas utilization equipment typically consists of either an engine-generator set with electric utility hook-up, an engine operating hydraulic or air pumps, or a gas boiler. Operating biogas-powered equipment continuously keeps the equipment temperature high enough to prevent condensation and sulfuric acid formation. Sulfuric acid is highly corrosive and can ruin expensive engines or boilers.

Where electricity production is desired, biogas is piped to an internal combustion engine. The engine drives a generator o produce electricity that can be used on the dairy 12 or sold. To maintain continuous operation, the engine throttle is adjusted to balance biogas use with production. Waste heat from the engine is used to heat the digester and for other farm heating needs. Most systems produce about 2 kilowatt-hours per day per 1,400 pound cow.

Concentration achieved by centrifugation has the further advantage of diminishing the necessary size of the digester necessary to handle a volume of manure. To get an idea of the size of an anaerobic digester 60 (as might be used in a conventional arrangement in contrast to either of the systems 10b and 10g), consider a digester 60 designed for 200 milking cows with a 20-day retention time. Assuming each high-producing milking cow produces 2.2 ft.$^3$ manure per day, the daily volume of manure from these milking cows would be expressed as 200 cows×2.2 ft.$^3$ manure/day/cow=440 ft.$^3$ manure/day. If dilution water is needed for manure flowability or added from the milking center at a rate of 3 gallons per cow per day, the additional volume added daily would be expressed as 200 cows×3 gallons water/cow/day+7.5 gallons water/ft.$^3$ water 80 ft.$^3$ water/day The total material added daily to the digester, therefore, would equal 440 ft.$^3$ manure/day +80 ft.$^3$ water/day=520 ft.$^3$ material/day. To hold 20-days-worth of manure and water, without the prior concentration by the centrifuge 26c, the digester volume would need to be 520 ft.$^3$/day×20 days=10,400 ft.$^3$. A digester 60 with a rigid cover, a 3 ft. head space for gas collection and a material volume (no bedding included) of 10,400 ft.$^3$, would be approximately 15 ft. deep and 33 ft. In diameter. This is far larger than is necessary when as in this preferred embodiment 10b, the feed to the digester 60 is concentrated by the centrifuge 26c and the disposition of the liquid fraction in the MVR 30. The digester 60 does not need to house inert matter and extra liquid the centrifuge removes.

The digester 60 fed with a higher solids concentration yields a higher concentration of digestible material for the microbes. Given this higher concentration, a smaller digester 60 digesting a more concentrated feed also requires less external energy to keep the smaller volume within the digester 60 suitably warm to produce an equivalent volume of biogas as by conventional digesting. Such savings yield more biogas for other use.

As can be readily appreciated in viewing each of FIGS. 4 and 5, the centrifuge 26c resides at a fork in the path of manure through the system. A liquid fraction and a solid fraction emerge from the centrifuge 26c. The solid fraction is fed to the digester 60, as stated above, and the liquid fraction is fed to the MVR 30. Importantly, operation of the centrifuge 26c can determine the moisture of solid fraction emerging from the centrifuge 26c. Remembering that moisture includes nutrients, a drier solid fraction means that more of the nutrients remain in the liquid fraction.

The performance of a decanting centrifuge depends on factors such as the G-force, dewatering volume, and retention time. Remembering that centrifuges produce, by centrifugal forces a greater effect on particulate held in suspension in the manure than would gravity in a settling separation. The term G-force or G-value is frequently used to quantify the force acting on those solids: it is the multiple of the gravitational constant obtained in the centrifuge. The centrifugal acceleration or G-value will increase with drum diameter and speed. Experimentation has shown that the maximum effective separation occurs when G-values approach 2200, thus producing the driest solid matter and the greatest volume of the liquid fraction per unit volume of manure.

The retention time is the length of time that the liquid remains in the bowl before discharge. Longer retention time will produce more efficient solid-liquid separation, i.e. a drier solid fraction and produces more volume of the liquid fraction. In short, the several factors in operation allow for greater or lesser dewatering of the solid fraction and, therefore, the ratio between the volume of the solid fraction relative to the volume of the liquid fraction can be varied by changing the selected drum diameter, the rotational speed, a weir plate diameter and an input screw rotational speed. As the effect of each of these is known and calculable, the relative outputs of each of the liquid and the solid fractions can be selected to optimize operation based upon the size of dairy and the manure output of the herd.

Generally speaking, the more efficiently the centrifuge 26*c* debaters the solids in the manure, the better condition is the liquid fraction presented to the MVR 30 evaporator. In general, good operational balance can be achieved when the solid fraction the digester 60 receives represents between 15% and 50% of the volume originally fed to the centrifuge. This material may contain between 25% and 75% of the available energy potential via digestion of the original feed stream to the centrifuge 26*c* and the liquid fraction fed to the MVR 30 represents the remaining volume of between 50% and 85%. The exact split is optimized to achieve the benefits for the digester 60 and MVR 30 feed streams in order to meet the nutrient and fecal coliform reduction needs of the dairy. Because the flow of the liquid fraction will, thus, have little particulate matter entrained within, including fiber and other non-nutrient solids, the MVR 30 can operate more efficiently. The reduction in solids in the MVR 30 feed causes that feed to have a lower viscosity than an unseparated manure feed. This lower viscosity requires less energy for pumping manure to feed the MVR 30. Also, a lower viscosity feed to the MVR 30 results in less fouling of the capillaries of the heat exchanger in the MVR 30 and as a result the heat exchanger is more effective. The removal of non-nutrient solids has the additional benefit of improving the final nutrient (nitrogen, phosphorus, and potassium) value of the resulting fertilizer once it has been concentrated since the final solids are not diluted by the non-nutrient solids, all of which have been previously removed.

As stated above, all components of the system 10*b* (FIG. 4) whose reference numbers coincide with those of the general system 10 (FIGS. 1 and 2) have the same function and will not be separately explained here. Thus, when moving to the gasification system 10*a* depicted in FIG. 5, the system's 10*g* components are depicted with the same specific reference numbers perform the same functions as those in the generalized example system 10 depicted in FIG. 1. For example, the storage water removed at the ammonia stripping vessel 37 which can be used for either flushing the dairy 12 or for irrigation, is stored in a storage lagoon 38. The production of fertilizer is exactly as portrayed in the Organic. Fertilizer module 155 (FIG. 2). The liquid fraction emerges from the centrifuge 26*c*, to follow the same path through the remaining components, including the dryer 41, the organic fertilizer module 155, the ammonia removal system 37, the storage lagoon, 38, and the collection of ammonia sulfate 39. The differences between the general example and the two preferred embodiments emerge on the branch that carries the solid fraction emerging from the centrifuge 26*c*. Rather than feeding a digester 60 (FIG. 4), in this embodiment, the solid fraction feeds a gasification plant 70.

Moving then to the syngas generation system 10*g* (FIG. 5), one can readily, perceive that the components extending from the dairy 12 to and including the centrifuge are identical to the general case 10 (FIGS. 1 and 2) and to the biogas system 10*b*. Moisture content of dairy manure is typically around 87% by mass, making it too moist to gasify in its native state. Steam inhibits gasification. Therefore using the centrifuge 26*c* to separate the liquid fraction to feed the MVR 30 renders the solid fraction dry enough for efficient gasification.

Gasification of manure produces a fuel gas, it has additional benefits as well. Temperatures achieved within the gasification plant 70 are sufficient to destroy pathogens, as well as odor-generating organic compounds and hormones and does so in as little as 15 minutes, which is much quicker than the days and months required to process manure using anaerobic digestion as described in the system 10*b* for producing biogas. Higher heat than that used in digestion is used to strip off hydrocarbons from biomass in the absence of oxygen. Just as in the production of charcoal, heating a biomass without sufficient oxygen for combustion dries and concentrates the fuel. So, gasification is a series of chemical reactions that occur when heating a suitable organic material in a controlled, low-oxygen environment to the point that the hydrocarbons (simple organic compounds that contain only hydrogen and carbon) are driven off of that organic material to accumulate in a headspace above the material as synthesis gas ("syngas"). Syngas is composed of hydrogen and carbon monoxide with smaller amounts of methane and carbon dioxide. The syngas is collected and used for heat and energy generation, in some instances within the system 10*g* itself. Gasification occurs in two phases, each dictated by temperature, i.e. pyrolysis and thermal gasification.

After emerging from the centrifuge 26*c*, the solid fraction is subjected to pyrolysis, a thermal decomposition of materials at elevated temperatures in an inert atmosphere such as a vacuum. Pyrolysis initiates at around 230° C. During pyrolysis, thermally unstable components, such as lignin in biomass are broken down and evaporated with other volatile components. The resulting pyrolysis gas consists mainly of tar (condensable hydrocarbons or hydrocarbons with six or more carbon ions in a molecular chain, including polycyclic aromatic hydrocarbons (PAH) and methane ($CH_4$), also liberating quantities of steam or nitrogen and carbon dioxide ($CO_2$). The solid residual contains carbon structures and ashes. Char (fixed carbon) and ash are the by-products of the process which are not vaporized. In the second step, char is gasified through the reactions with oxygen, steam and hydrogen. Some of the unburned char is combusted to release the heat needed for the endothermic gasification reactions.

Main gasification products are gas, char 97, and tars. Gasification products, their composition and amount are strongly influenced by gasification agent, temperature, pressure, heating rate and fuel characteristics (composition, water content, granulometry). Gaseous products formed during the gasification may be further used for heating or electricity production. The main gas components are $CO$, $CO_2$, $H_2O$, $H_2$, $CH_4$ and other hydrocarbons.

The gasification of any organic matter in the gasification plant 70 will leave a porous surface suitable for absorbing and holding water by capillary action within the pores. The original vascular structure of the cellulose within the manure and the pores created by escaping gases combine to produce a light and porous material. In addition, then, to the mineral content within the char 97, the char 97, itself, will be capable of retaining water assisting germination and flourishing of plants fertilized by the char 97.

Just as biogas in the digester 60 is collected in the head space, syngas is collected in the gasification plant 70 and from there is distributed through the system 10b through a syngas energy system 72 and is similarly used for exploiting the energy content in the gas. Syngas is burned in either an engine-generator set with electric utility hook-up, an engine operating hydraulic or air pumps, or a gas boiler. Also, waste heat from the engine is used to preheat the solid fraction eve to the point of pyrolysis and, as with biogas, that heat is available for other farm heating needs.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of generating feedstock for production of hydrocarbon gas, ammonium sulfate, and a nutrient concentrate, the method comprising:
   centrifuging a centrifuge feed of dairy manure within a centrifuge to produce each of a liquid and a solid fraction emerging from the centrifuge, the centrifuge being operated such that:
      the solid fraction emerging from the centrifuge has a solid fraction volume of between 15 and 50% of the volume of the centrifuge feed of dairy manure, and
      the liquid fraction emerging from the centrifuge has a liquid fraction volume of between 50 and 85% of the volume of the centrifuge feed of dairy manure;
   evaporating the liquid fraction by operation of a mechanical vapor recompressor ("MVR") evaporator to produce a nutrient concentrate and a condensate, the condensate comprising ammonia-laden water;
   introducing the ammonia-laden water into an ammonia stripping vessel;
   chemically reacting, in the ammonia stripping vessel, the ammonia-laden water to form ammonium sulfate from the ammonia gas entrained in the air flow; and
   conveying the solid fraction as feedstock to produce a volume of hydrocarbon gas by operation upon the solid fraction by one of a hydrocarbon generator group consisting of a digester and a gasification plant.

2. The method of claim 1, further comprising:
   conveying the nutrient concentrate into a composter to produce a nutrient-rich compost.

3. The method of claim 2, wherein the conveying the nutrient concentrate into a composter includes the drying of the nutrient concentrate in a dryer.

4. The method of claim 2, wherein conveying the nutrient concentrate into the composter selected from a group consisting of:
   innoculating the nutrient concentrate with aerobic thermophilic microorganisms; and
   introducing dried organic matter into the composter.

5. The method of claim 2 further comprising:
   drying the nutrient-rich compost to produce fertilizer.

6. The method of claim 1, wherein solids are removed from the dairy manure to produce the centrifuge feed by a primary separator chosen from a primary separator group consisting of
   a stationary screen separator;
   a vibrating screen separator;
   a rotating screen separator;
   a slope screen separator;
   a wedge-wire screen;
   a rotary separator;
   a roller press;
   a belt press;
   a screw press; and
   a plate press.

7. The method of claim 1 wherein the volume of hydrocarbon gas is used to power one of a biogas energy system group consisting of:
   an internal combustion engine to rotate a shaft;
   a gas combustion heater to generate heated air;
   a water heater;
   a gasification plant;
   a digester; and
   a dryer.

8. A system to generate a nutrient concentrate, the system comprising:
   a centrifuge to produce each of a liquid and a solid fraction emerging from the centrifuge as a result of centrifuging a centrifuge feed of dairy manure, the centrifuge being operated such that:
      the solid fraction emerging from the centrifuge has a solid fraction volume of between 15 and 50% of the volume of the centrifuge feed of dairy manure, and
      the liquid fraction emerging from the centrifuge has a liquid fraction volume of between 50 and 85% of the volume of the centrifuge feed of dairy manure;
   a mechanical vapor recompressor evaporator ("MVR") to evaporate the liquid fraction to produce a nutrient concentrate and a condensate, the condensate comprising ammonia-laden water vapor; and
   a blower to generate an air flow to entrain the ammonia-laden water vapor, thereby to convey the ammonia-laden water vapor to an ammonia stripping vessel.

9. The system of claim 8, further comprising:
   a composter to receive the nutrient concentrate to produce a nutrient-rich compost and a volume of hydrocarbon gas.

10. The system of claim 9, further comprising a dryer to dry the nutrient concentrate to a selected moisture content before receiving the nutrient concentrate in the composter.

11. The system of claim 9, wherein in addition to the nutrient concentrate, the composter is configured to receive an additive selected from the group consisting of:
    aerobic thermophilic microorganisms sufficient to innoculate the nutrient concentrate; and
    dried organic matter.

12. The system of claim 9 further comprising:
    a drying module to convert the nutrient-rich compost to produce fertilizer.

13. The system of claim 9, further including a primary separator to screen dairy manure to produce the centrifuge feed, the primary separator chosen from a primary separator group consisting of
    a stationary screen separator;
    a vibrating screen separator;
    a rotating screen separator;
    a slope screen separator;
    a wedge-wire screen;

a rotary separator;
a roller press;
a belt press;
a screw press; and
a plate press.

14. The system of claim 9 wherein the volume of hydrocarbon gas is used to power one of a biogas energy system group consisting of:
an internal combustion engine to rotate a shaft;
a gas combustion heater to generate heated air;
a water heater;
a gasification plant;
a digester; and
a dryer.

15. A system for producing fertilizer from dairy manure, the system comprising:
a centrifuge for dewatering dairy manure to produce each of a liquid fraction and a solid fraction:
the solid fraction emerging from the centrifuge has a solid fraction volume of between 15 and 50% of the volume of the centrifuge feed of dairy manure, and
the liquid fraction emerging from the centrifuge has a liquid fraction volume of between 50 and 85% of the volume of the centrifuge feed of dairy manure; and
a mechanical vapor recompressor evaporator ("MVR") to evaporate the liquid fraction to produce a nutrient concentrate and a condensate, the condensate comprising ammonia-laden water.

16. The system of claim 15 further comprising:
a drying module for receiving the nutrient concentrate, the drying module comprising:
a composter for receiving the nutrient concentrate turning the nutrient concentrate into nutrient-rich compost;
a compost dryer to dry the nutrient-rich compost into fertilizer.

17. The system of claim 16 wherein the composter is further configured to receive aerobic thermophilic microorganisms to inoculate the nutrient concentrate.

18. The system of claim 15 wherein the centrifuge is a decanter centrifuge.

19. The system of claim 15, further including a primary separator to screen dairy manure to produce the centrifuge feed, the primary separator chosen from a primary separator group consisting of:
a stationary screen separator;
a vibrating screen separator;
a rotating screen separator;
a slope screen separator;
a wedge-wire screen;
a rotary separator;
a roller press;
a belt press;
a screw press; and
a plate press.

20. The system of claim 15 wherein further comprising a sludge dryer to drive moisture out of the nutrient concentrate to reach a desired state of dryness.

21. A method for compounding fertilizer from liquid manure without releasing nutrients into the ambient environment, the method comprising:
centrifugally separating liquid manure into nutrients as a liquid centrate and a generally organic matter cake:
evaporating a vapor containing ammonia from the liquid centrate by means of mechanical vapor recompression (MVR) to produce a nutrient sludge; and
producing a combustible gas by either one of digesting or gasifying the generally organic matter cake.

22. The method of claim 21 further comprising:
combusting the combustible gas to power one of a biogas energy system group consisting of:
an internal combustion engine to rotate a shaft;
a gas combustion heater to generate heated air;
a water heater;
a gasification plant;
a digester; and
a dryer.

23. The method of claim 21 further comprising:
reclaiming ammonia sulfate by reacting the vapor containing ammonia with sulfuric acid.

24. The method of claim 21 further comprising:
drying the nutrient sludge to produce fertilizer for crops.

25. The method of claim 21 further comprising:
composting the nutrient sludge.

26. The method of claim 25, wherein the composting of the nutrient sludge is composting in the presence of an introduced organic matter, selected from the group consisting of ammonium sulfate, and aerobic thermophilic microorganisms.

* * * * *